United States Patent [19]

Hikawa et al.

[11] Patent Number: 5,057,686
[45] Date of Patent: Oct. 15, 1991

[54] SELF-STABILIZING PHOTOELECTRIC DISPLACEMENT DETECTOR

[75] Inventors: Norihito Hikawa, Yokohama; Wataru Ishibashi, Kawasaki, both of Japan

[73] Assignee: Mitutoyo Corporation, Tokyo, Japan

[21] Appl. No.: 443,339

[22] Filed: Nov. 30, 1989

[30] Foreign Application Priority Data

Oct. 12, 1988 [JP] Japan .................................. 63-256742
Oct. 12, 1988 [JP] Japan .................................. 63-256743

[51] Int. Cl.$^5$ .............................................. G01D 5/34
[52] U.S. Cl. ............................ 250/231.16; 250/237 G
[58] Field of Search ................. 250/231.14, 231.16, 250/237 G, 237 R; 356/373–375; 341/13

[56] References Cited

U.S. PATENT DOCUMENTS

| | | | |
|---|---|---|---|
| 3,427,463 | 2/1969 | Weyrauch | 250/237 G |
| 3,566,136 | 2/1971 | Kamachi | 250/237 G |
| 4,318,617 | 3/1982 | Orsen | 250/237 G |
| 4,678,908 | 7/1987 | La Plante | 250/231.14 |
| 4,680,466 | 7/1987 | Kuwahara et al. | 341/13 |
| 4,701,615 | 10/1987 | Schmitt | 250/237 G |
| 4,861,982 | 8/1989 | Smid et al. | 250/237 G |
| 4,862,396 | 8/1989 | Nirumandrad | 250/237 G |

FOREIGN PATENT DOCUMENTS 0232625 12/1986 European Pat. Off. .
8401824 5/1984 PCT Int'l Appl. .

Primary Examiner—David C. Nelms
Assistant Examiner—S. Allen
Attorney, Agent, or Firm—Oliff & Berridge

[57] ABSTRACT

A reference light transmission window is provided in the vicinity of a sub grating disposed on a usual index scale, and a light transmitted by the reference light transmission window is photoelectrically converted to a reference signal. When a main scale is of an optical transmission type, a light transmitted through a reference light transmission window of a second index scale, which is provided on the opposite side to the usual index scale so as to put the main scale between the second index scale and the usual index scale, or a light among those modulated by the main grating and by the sub grating, which light is not used for displacement detection, is photoelectrically converted to a DC level detection signal. The reference signal or DC level detection signal is used to correct DC level variations of the displacement detection signal.

9 Claims, 13 Drawing Sheets

LONGITUDINAL DIRECTION OF MAIN SCALE

DISPLACEMENT DETECTION SIGNAL $a$

REFERENCE SIGNAL $r_a$ $a - r_a$ $(a - r_a) - (c - r_c)$

← LONGITUDIAL
  DIRECTION
  OF MAIN SCALE →

← LONGITUDIAL
  DIRECTION
  OF MAIN SCALE →

← LONGITUDIAL
  DIRECTION
  OF MAIN SCALE →

SINGLE PHASE SIGNAL

DIFFERENTIAL SIGNAL

SELF-STABILIZING PHOTOELECTRIC DISPLACEMENT DETECTOR

BACKGROUND OF THE INVENTION

1. Field of the Invention

The present invention relates to a photoelectric displacement detector and, more specifically, to a photoelectric displacement detector capable of producing a stable displacement detection signal by correcting variations of a DC level of the same for thereby raising interpolations accuracy and improving a responsive scanning speed.

2. Description of the Related Art

A photoelectric type displacement detector is known in a field where amounts of feeding of tools in machine tools and other like quantities are measured. In such a photoelectric displacement detector, a main scale, on which a periodic main grating is formed, is fixed on one of opposite members, and a detector is fixed to the other member, the detector including an optically transparent index scale, on which a periodic sub grating is formed correspondingly to the main grating, an illuminating optical system composed of a light source, and an optical detector for photoelectrically converting a light from the illuminating optical system which has been modulated by the main grating and the sub grating, whereby a periodically varying detection signal is generated in response to a relative displacement between both members.

Referring to FIG. 21, a conventional reflecting photoelectric displacement detector is exemplarily illustrated. The detector includes a light emitting diode (LED) 10 as a light source, a collimator lens 12 for collimating a light emitted from the LED 10 into a parallel illuminating light, a main scale 14, on which a periodic main grating 16 is formed, an optically transparent index scale 18 disposed relatively movably with respect to the main scale 14 and having a periodic sub grating 20 formed thereon corresponding to the main grating 16, and an optical detector element 22 for displacement detection which photoelectrically converts a reflected light R from the collimator lens 12, the light R being reflected by the main grating 16 of the main scale 14 and transmitted by the sub grating 20 of the index scale 18. The detector thereby generates a periodic detection signal responsively to a relative displacement between the main scale 14 and the index scale 18.

In such a photoelectric displacement detector, the sub gratings 20 and the optical detector elements 22, amount for example is four in total, respectively, as illustrated in FIG. 22, two on the index scale 18 in a direction parallel to graduations on the grating (vertical direction in the figure) and two on the same index scale longitudinally of the main scale (horizontal direction in the figure). Assume, for example, the phase of the sub grating 20a to be a reference "0", that of the sub grating 20b to be −90°, that of 20c to be +180°, and 20d to be −90°, the optical detector elements 22a, 22c, and 22b, 22d disposed diagonally on the detector with respect to the longitudinal direction of the main scale generate difference displacement detection signal (a−c), (b−d), two phase detection signals as shown in FIG. 23, among displacement detection signals a to d detected by the four optical detector elements 22a to 22d disposed correspondingly to the sub gratings 20a to 20d. Here, in FIG. 22, designated at 24, 26 are differential amplifiers.

The conventional photoelectric displacement detector assures as described above two detection signals different in their phases 90° from each other for discrimination of the direction of the displacement and for a precision measurement by electrical interpolation. In this situation, by the use of the aforementioned differential detection system, variations of a DC level of the displacement detection signals and phase variations due to a change in parallelism between the main scale 14 and the index scale 18 can be corrected.

However, the main scale 14 is, if in a continuous length of 300 mm or more for example, constructed in general by first positioning it on a stepper, and then transcribing an original scale of a short length on it, and exposing it to a light length by length. Accordingly, the thickness (depth) of chrome of grating graduations is varied as it goes longitudinally, which results in variations of reflectivity and transmittance of the scale and slight variations of the line width of the graduations, making it very difficult to form the scale uniformly. In the main grating of the main scale of 8 micrometers pitch for example, variations of a detection signal sometimes amount to about 10% because of the line width being variable by about 0.2 micrometer or about 2.5% together with other undesirable factors.

Such a conventional photoelectric displacement detector has some problems as follows. Existence of such longitudinal variations causes a change in a DC level of a detected output. Further, even with the aforementioned differential technique, correction of variations of the DC level is unsatisfactory if there is any difference between variations of DC levels of difference signals of opposite phases. Particularly, in a reflecting displacement detector wherein a light source is provided at the center of sub gratings, an interval is increased between two optical detectors of different two phases (corresponding to the sub gratings 20a and 20c, and 20b and 20d), followed by a severely large relative difference between variations of DC levels.

SUMMARY OF THE INVENTION

In view of the drawbacks of the prior art, it is a primary object of the present invention to provide a photoelectric displacement detector which is capable of improving interpolation accuracy and a responsive scanning speed by correcting DC level variations of a displacement detection signal.

A second object of the present invention is to provide a reflecting photoelectric displacement detector with use of an optically transparent reflecting main scale which is capable of preventing any measurement error which might be caused by a back incident light from the back side of a main scale.

To achieve the primary object of the present invention, a photoelectric displacement detector comprises, in one aspect a main scale fixed to one of relatively movable members and including a main grating formed thereon, a light source, an index scale including a sub grating formed thereon, and a displacement detecting optical detector element for photoelectrically converting a light modulated at least by said main grating and said sub grating, all fixed to the other of the relatively movable members, for generating a periodic detection signal in response to a relative displacement between both members, and further comprising a reference light transmission window disposed in the vicinity of the sub grating of the index scale and a reference light optical detector element for photoelectrically converting a light transmitted through the reference light transmission window, whereby variations of a DC level of a displacement detection signal generated by said displacement detecting optical detector element are corrected using a reference signal generated by said reference light optical detector element.

In another aspect of the present invention, a photoelectric displacement detector comprises an optically transparent main scale fixed to one of relatively movable members and including a main grating formed thereon, a light source, a first index scale including a sub grating formed thereon, and a displacement detecting optical detector element for photoelectrically converting a light modulated at least by said main grating and said sub grating, all fixed to the other member of the relatively movable members, for generating a periodic detection signal in response to a relative displacement between both members, and further comprising a second index scale disposed on the opposite side to said first index scale with the main scale interposed between it and said first index scale and having a reference light transmission window formed thereon, and a DC level detecting optical detector element for photoelectrically converting the light transmitted through said main scale and said reference light transmission window, whereby DC level variations of a displacement detection signal yielded from said displacement detecting optical detector element are corrected with use of a DC level detection signal yielded by said DC level detecting optical detector element.

In another aspect of the present invention, a photoelectric displacement detector comprises an optically transparent main scale fixed to one of relatively movable members and including a main grating formed thereon, a light source, an index scale including a sub grating formed thereon, and a displacement detecting optical detector element for photoelectrically converting any one of a reflected light and a transmitted light modulated at least by said main grating and said sub grating, all fixed to the other member of the relatively movable members, for generating a periodic detection signal in response to a relative displacement between both members, further comprising a DC level detecting optical detector element for photoelectrically converting the other of the light modulated by said main grating and said sub grating, whereby DC level variations of a displacement detection signal yielded by said displacement detecting optical detector element are corrected with use of a DC level detection signal obtained by said DC level detecting optical detector element.

To achieve the second object of the present invention, a reflecting photoelectric displacement detector comprises a reflecting optically transparent main scale fixed to one of relatively movable members and having a main grating formed thereon, a light source, an index scale including a sub grating formed thereon, and a displacement detecting optical detector element for photoelectrically converting a light modulated at least by said main grating and said sub grating, all fixed to the other of the relatively movable members, for generating a periodic detection signal in response to a relative displacement of both members, further comprising a shielding cover provided on the opposite side of said index scale putting the main scale between it and the index scale for preventing a back light serving to illuminate the main grating from the back of the main scale.

The present invention has first been contemplated noticing that the amount of a light to correct the DC level variations is more effectively detected when the detection is done closer to the displacement detection portion.

More specifically, as illustrated in FIG. 1, reference light transmission windows 30a to 30d and reference light optical detector elements 32a to 32d for photoelectrically converting transmitted light passing through the corresponding reference light transmission windows 30a to 30d are provided just on sides of respective sub gratings 20a to 20d formed on an index scale 18. Further, as exemplarily illustraed in FIG. 2 for the sub grating 20a, a detection signal is assumed to be given by a difference $(a-ra)-(c-rc)$ between a difference $(a-ra)$ between a displacement detection signal a transmitted through the sub grating 20a and a reference signal ra transmitted through the corresponding reference light transmission window 30a, and a difference $(c-rc)$ between a displacement detection signal c transmitted through the sub grating 20c and a reference signal rc transmitted through the reference light transmission window 30c. Therefore, a variation of a DC level of the detection signal can be completely corrected, resulting in improvements of interpolation accuracy and a responsive scanning speed.

The present invention has further been contemplated on the basis of the following experimental facts found in a case where the optically transparent main scale was employed.

(1) In case of a reflecting type photoelectric displacement detector, no transmission light is utilized, while in case of a transmission type photoelectric displacement detector, no reflected light is utilized.

(2) A displacement detection signal a (a signal yielded by detecting the amount of a reflected light in case of the reflecting type, while a signal yielded by detecting the amount of a transmitted light in case of the transmission type) generally includes, as illustrated in FIG. 3, not only an AC component required for displacement detection but also a DC component $a''$ which might cause a measurement error.

(3) A DC level $a'$ of a signal (DC level detection signal), which is yielded by detecting the amount of said light not utilized (transmitted light in the reflecting type, while reflected light in the transmission type) forms, as illustrated in FIG. 3, a signal which varies in the opposite direction to that of the DC component $a''$ involved in the displacement detection signal a illustrated in FIG. 3.

(4) Therefore, when the dispalcement detection signal a and DC level detection signal $a'$ are summed, a DC level $a''+a'$ of the summed signal $a+a'$ is insensitive to the scattering or variations of the width of graduation lines and is substantially kept at a constant as illustrated in FIG. 3.

Specifically, as illustrated in FIGS. 11 and 17, a second index scale 134, through which a reference light transmission window (sub grating 136a', 136b') has been formed, is disposed on the opposite side of a first index scale 118 putting a main scale 114 between it and the first index scale 118, and light transmitted through a main grating 116 and the reference light transmission window (136a', 136b') is photoelectrically converted by a DC level detecting optical detection element 138a', 138b' to thereby provide a DC level detection signal $a'$ as illustrated in FIG. 3. The DC level detection signal $a'$ is usable to correct the DC level variations of the displacement detection signal a, to thereby improve interpolation accuracy and a responsive scanning speed.

Additionally, as exemplarily illustrated in FIG. 20, a DC level detecting optical detector element 138, which is to photoelectrically convert a light that is not used for displacement detection in the light modulated by the main grating 116 and the sub grating 120, can be provided to assure the same advantages as described above.

The above principles can be applied to both a reflecting type displacement detector and a transmission type displacement detector without limitation.

Furthermore, when an optically transparent reflecting type main scale is used in a reflecting type photoelectric displacement detector, a displacement detection signal is varied by an oppositely incident light illuminating the main grating from the back side of the main scale to produce a measurement error. The difficulty can be solved as illustrated in FIG. 16 by providing a shielding cover 142, which prevents the oppositely incident light which illuminates the main grating 116 from the back side (right hand side in the figure) of the main scale 114, on the opposite side of the index scale 118 so as to put the main scale 114 between the shielding cover and the index scale 118.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DESCRIPTION OF THE PREFERRED EMBODIMENTS

In what follows, preferred embodiments of the present invention will be described with reference to the accompanying drawings.

Figure 1:
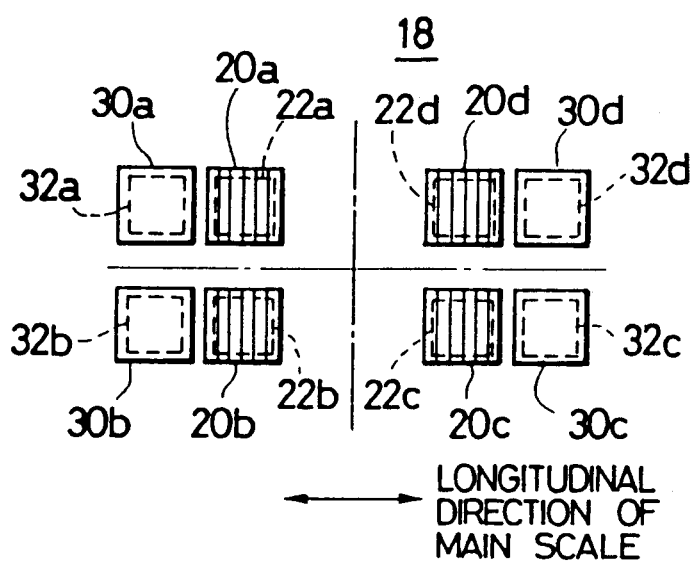
FIG. 1 is a front view illustrating a first principle of the present invention wherein sub gratings and reference light transmission windows are disposed on an index scale.
Figure 2A:
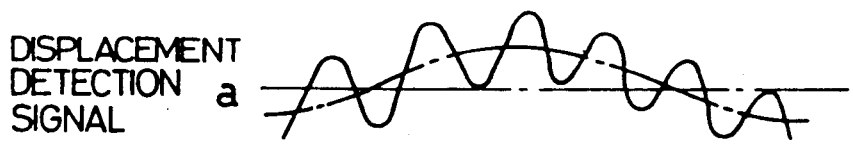
FIGS. 2A-2D depict diagrams of waveforms of a displacement detection signal, a reference signal, a detection signal after correction, and one of two phase detection signals illustrating operation of the present invention.
Figure 2B:
Figure 2C:
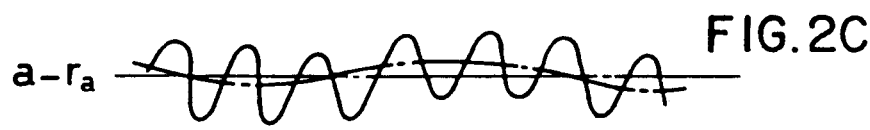
Figure 2D:
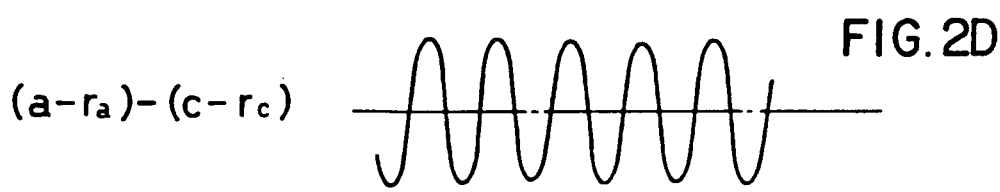
Figure 4:
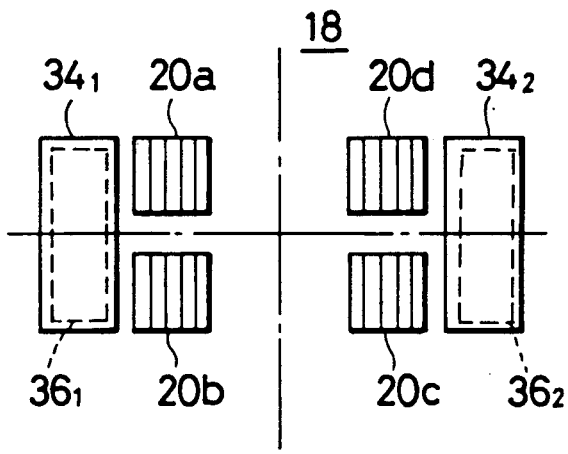
FIG. 4 is a front view illustrating a portion of a first embodiment of a photoelectric displacement detector according to the present invention.

A first embodiment of the present invention is constructed from a viewpoint of the first principle as illustrated in FIGS. 1 and 2. The first embodiment includes, in the same construction as in FIG. 1 and as illustrated in FIG. 4, a vertically-elongated reference light transmission window $34_1$ disposed on one side of two sub gratings 20a and 20b, a vertically-elongated reference light transmission window $34_2$ disposed on one side of the two other sub gratings 20c and 20d but oppositely to the sub gratings 20a and 20b, and vertically-elongated reference light optical detector elements $36_1$, $36_2$ for photoelectrically converting a light transmitted by the reference light transmission windows $34_1$, $34_2$, respectively.

The other construction is indentical to that shown in FIG. 1 and hence the description will be omitted.

Figure 5:
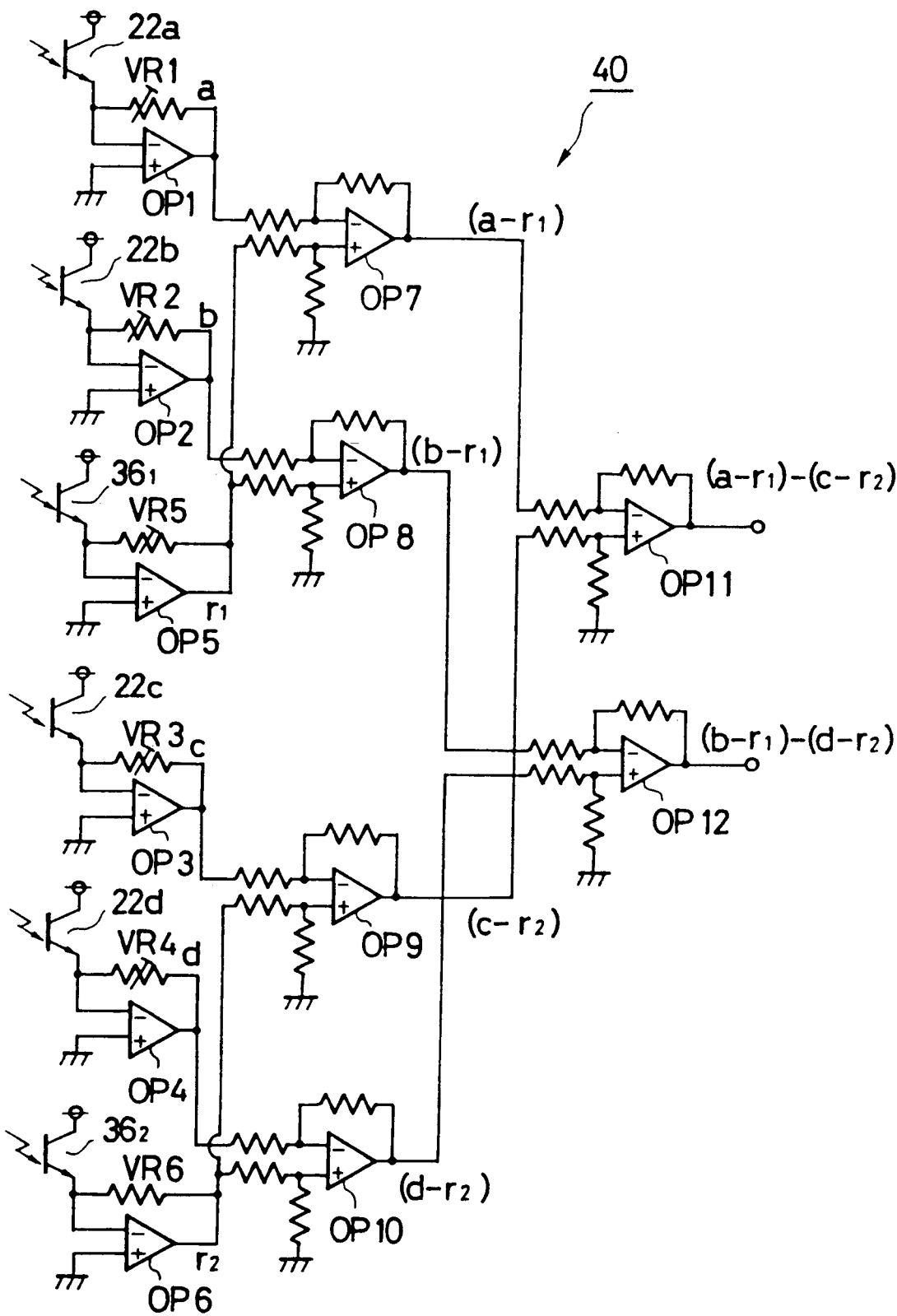
FIG. 5 is a block diagram illustrating the construction of a signal processing circuit in the first embodiment.

FIG. 5 shows a signal processing circuit 40, which is to form two phase detection signals from outputs of displacement detecting optical detector elements 22a to 22d identical to those shown in FIG. 1 and of the aforementioned reference light optical detector elements $36_1$, $36_2$. The signal processing circuit 40 includes, as illustrated in FIG. 5, an operational amplifier OP1 which is made variable in its amplification factor by a variable resistor VR1 and which is to amplify an output signal a from the optical detector element 22a, an operational amplifier OP2 which is made variable in its amplification factor by a variable resistor VR2 and which is to amplify an output signal b from the optical detector element 22b, an operational amplifier OP3 which is made variable in its amplification factor by a variable resistor VR3 and which is to amplify an output signal c from the optical detector element 22c, an operational amplifier OP4 which is made variable in its amplification factor by a variable resistor VR4 and which is to amplify an output signal d from the optical detector element 22d, an operational amplifier OP5 which is made variable by a variable resistor VR5 and which is to amplify an output signal $r_1$ from the reference light optical detector element $36_1$, an operational amplifier OP6 which is made variable in its amplification factor by a variable resistor VR6 and which is to amplify an output signal $r_2$ from the reference light optical detector element $36_2$, an operational amplifier OP7 for delivering a difference signal $(a-r_1)$ between the outputs from the operational amplifiers OP1 and OP5, an operational amplifier OP8 for delivering a difference signal $(b-r_1)$ between the outputs from the operational amplifiers OP2 and OP5, an operational amplifier OP9 for delivering a difference signal $(c-r_2)$ between the outputs from the operational amplifiers OP3 and OP6, an operational amplifier OP10 for delivering a difference signal $(d-r_2)$ between the outputs from the operational amplifiers OP4 and OP6, an operational amplifier OP11 for delivering a difference signal $(a-r_1)-(c-r_2)$ between the outputs from the operational amplifier OP7 and OP9 as one of the aforementioned two phase detection signals, and an operational amplifier OP12 for delivering a difference signal $(b-r_1)-(d-r_2)$ between the outputs from the operational amplifiers OP8 and OP10 as the other of the two phase detection signals.

In the present embodiment, when the index scale 18 is moved relatively to the main scale 14, two phase detection signals are given as shown in FIG. 2 (in case of $(a-ra)-(c-ra)$) with its amplitude being varied but without any DC component, showing that a very stable detection signal is assured and a highly accurate measured signal is yielded by highly accurate interpolation of the resulting detection signal.

In the present embodiment, the reference light transmission windows 30a and 30b, and 30c and 30d shown in FIG. 1 are common to the reference light optical detector elements $36_1$ and $36_2$, respectively, to provide averaged signals to the latter elements for proper, not excessive, correction by the reference signal.

Figure 6:
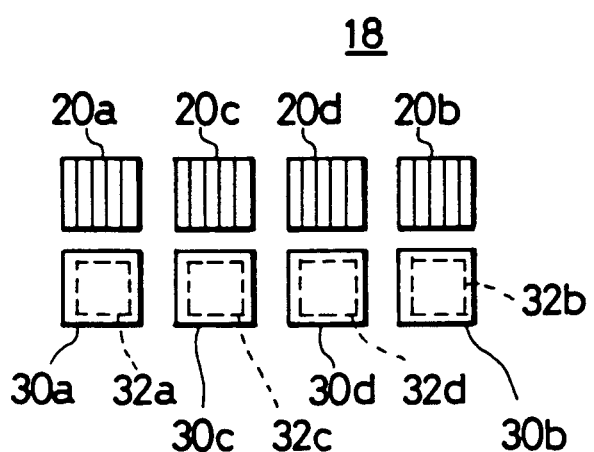
FIG. 6 is a front view illustrating a portion of a second embodiment according to the present invention.
Figure 7:
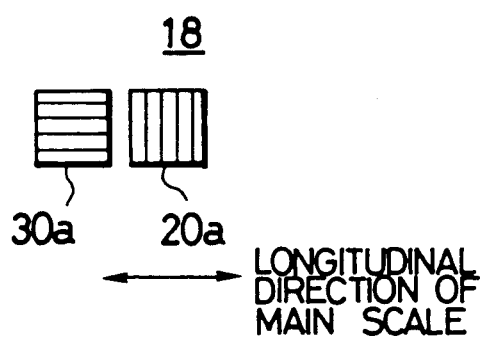
FIG. 7 is a front view illustrating a modification of a reference light transmission window in the foregoing embodiments.

Successively, a second embodiment of the present invention will be described with reference to FIG. 6.

In the second embodiment, second gratings 20a to 20d are provided in a straight line on the index scale 18 and reference light transmission windows 30a to 30d and the reference light optical detector elements 32a to 32d are provided in close vicinity to each other beneath and respectively correspond to the gratings 20a to 20d.

The other details are identical to the first embodiment, and hence the description will be omitted.

Here, it should be noticed that although in the above description the reference light transmission windows 30a to 30d, and $34_1$ and $34_2$ were all simple transmission windows over which no grating was formed, gratings may be formed over the reference light transmission window 30a in a direction perpendicular to the main grating or in a direction perpendicular to the sub grating 20a, for restricting the amount of the transmitted light.

Figure 8:
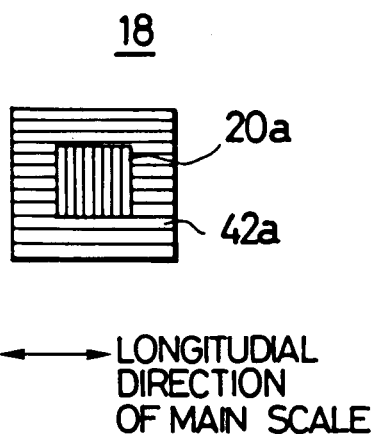
FIG. 8 is a front view illustrating the construction of a portion of a third embodiment of the present invention.

In the following, a third embodiment of the present invention will be described with reference to FIG. 8.

In the third embodiment, a reference light transmission window 42a is provided in close vicinity to and outside of the sub grating 20a.

If the sub grating 20a and the reference light transmission window 42a are arranged in their areas such that the amounts of lights transmitted thereby are substantially equal to each other, no electrical level adjustment would be required easing the whole adjustment.

In the present embodiment, the centers of gravity of the sub grating 20a and the reference light transmission window 42a are coincident with each other, so that those directional properties can be eliminated to assure a good reference signal.

Figure 9:
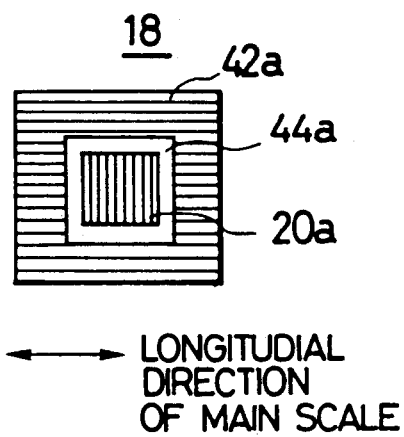
FIG. 9 is a front view illustrating the construction of a portion of a fourth embodiment of the present invention.

Successively, a fourth embodiment of the present invention will be described with reference to FIG. 9.

In the fourth embodiment, a separation zone 44a is interposed between the sub grating 20a and the reference light transmission window 42a in the same apparatus as that of the third embodiment.

In accordance with the fourth embodiment, signal and reference lights can be prevented from interfering with each other.

Figure 10:
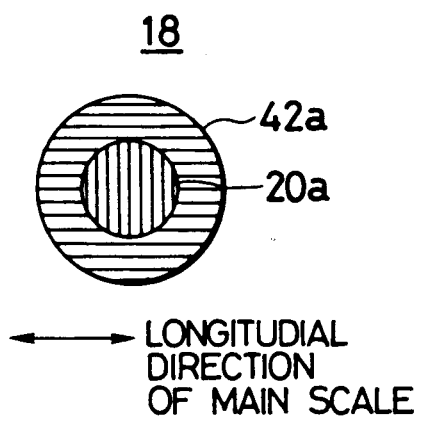
FIG. 10 is a front view illustrating the construction of a portion of a fifth embodiment of the present invention.

In the following, a fifth embodiment of the present invention will be described with reference to FIG. 10.

In the fifth embodiment, the sub grating 20a and the reference light transmission window 42a formed therearound are constructed circularly respectively and coaxially with each other, in the same apparatus as in the third embodiment.

In accordance with the present embodiment, the directional properties of the sub grating 20a and the reference light transmission window 42a are securely eliminated.

Also in the fifth embodiment, a separation zone may be provided between the sub grating 20a and the reference light transmission window 42a to improve the resolution of the light in the same manner as in the fourth embodiment.

Although in the third through fifth embodiments, the reference light transmission window 42a was disposed on the outside of the sub grating 20a, both may be reversed in their orders, the reference light transmission window on the central side and the sub grating on the peripheral side.

Figure 11:
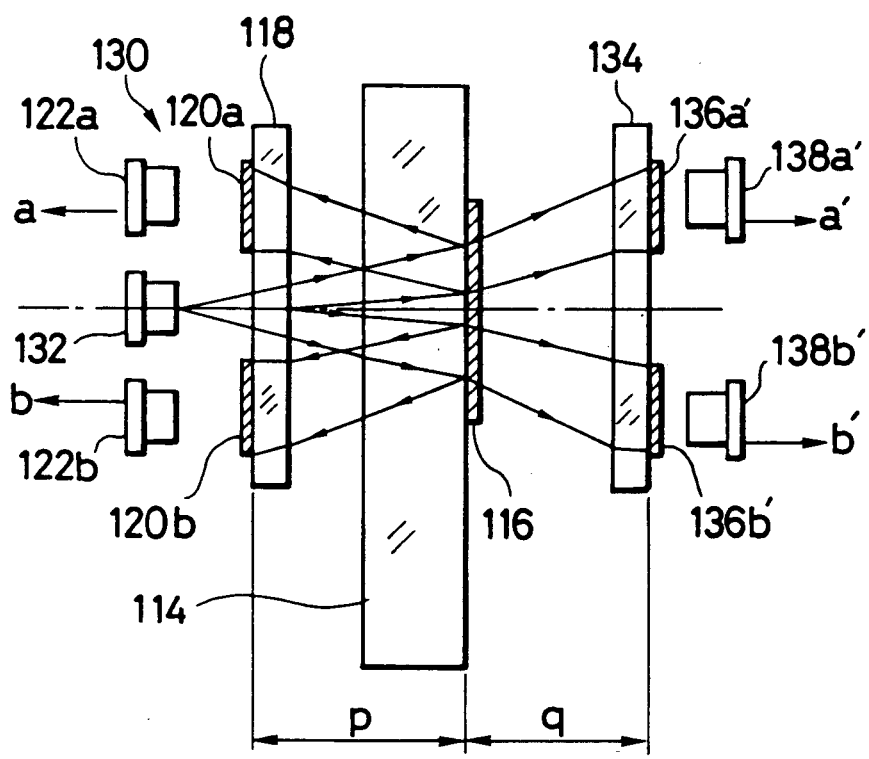
FIG. 11 is a cross sectional view illustrating the construction of a sixth embodiment of the present invention.

Successively, a sixth embodiment of the present invention based upon the principle illustrated in FIG. 3 will be described with reference to FIGS. 11 and 13.

In the sixth embodiment, a reflecting type photoelectric displacement detector comprises an optically transparent reflecting main scale 114 fixed to one of relatively movable members and including a main grating 116 formed thereon; a light source 132; a first index scale 118 (refer to FIG. 12) including four sub gratings 120a to 120d different in phases by 90° from each other all formed thereon; and a detector 130 including four displacement detecting optical detector elements 122a to 122d each for photoelectrically converting lights modulated by the main grating 116 and the respective sub gratings 120a to 120d, all fixed to the other of the relatively movable members, whereby a periodic detection signal is generated responsively to a relative displacement between both members, the detector further comprising a second index scale 134 (refer to FIG. 13) disposed on the detector 130 opposite to the first index scale 118 so as to put the main scale 114 between the second index scale and the first index scale 118, the scale 134 including four sub gratings 136a' to 136d' as the reference light transmission windows all formed thereon; and four DC level detecting optical detector elements 138a' to 138d' each for photoelectrically converting the lights transmitted by the main grating 116 and the respective sub gratings 136a' to 136d', whereby DC level variations of the displacement detection signals a to d detected by the displacement detecting optical detector elements 122a to 122d are corrected with use of DC level detection signals a' to d' yielded by the DC level detecting optical detector elements 138a' and 138d'.

Figure 12:
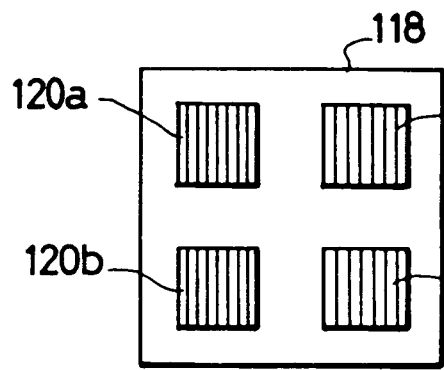
FIG. 12 is a front view illustrating a first index scale for use in the sixth embodiment.

On the first index scale 118, the four sub gratings 120a to 120d, which have graduations extending in the same direction (in a vertical direction in FIG. 12) as the main grating 116 formed on the main scale 114, are disposed shifting their phases by 90° mutually, as illustrated in FIG. 12 in detail.

Figure 13:
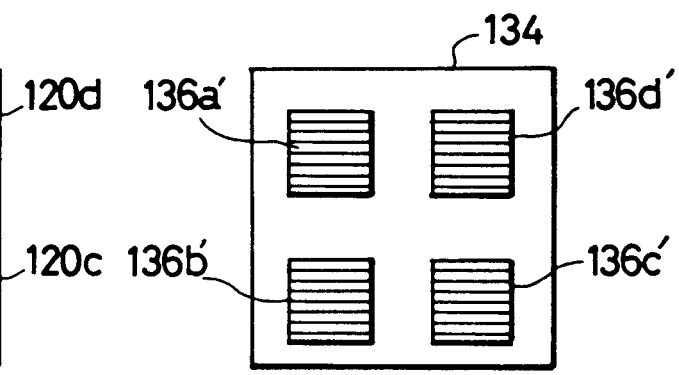
FIG. 13 is a front view illustrating a second index scale for use in the sixth embodiment.

In constrast, on the second index scale 134, the four sub gratings 136a' to 136d', which serve to adjust the amount of the associated lights and have graduations extending horizontally in FIG. 13, are disposed as illustrated in the same figure in detail. It is desirable that a distance p between the sub gratings 120a to 120d on the first index scale 118 and the main grating 116 on the main scale 114, and a distance q between the main grating 116 and the sub gratings 136a' to 136d' on the second index scale 134 are substantially optically equal to each other. If the conditions p=q are satisfied, effective areas of the sub grating 120a on the first index scale 118 and of the sub grating 136a' on the second index scale 134 are substantially identical to each other, which effective area equivalence also includes cases of the sub gratings 120b and 136b', 120c and 136c', and 120d and 136d' such that the amount of the light, which reaches the displacement detecting optical detector elements 122a to 122d, and that of the light, which reaches the DC level detecting optical detector elements 138a' to 138d' are substantially equal to each other.

If the distances p and q are set to be different, the ratios of the effective areas of the sub gratings 120a through 120d and of the respective sub gratings 136a' through to 136d' may be set to be the ratio p/q.

Figure 14A:
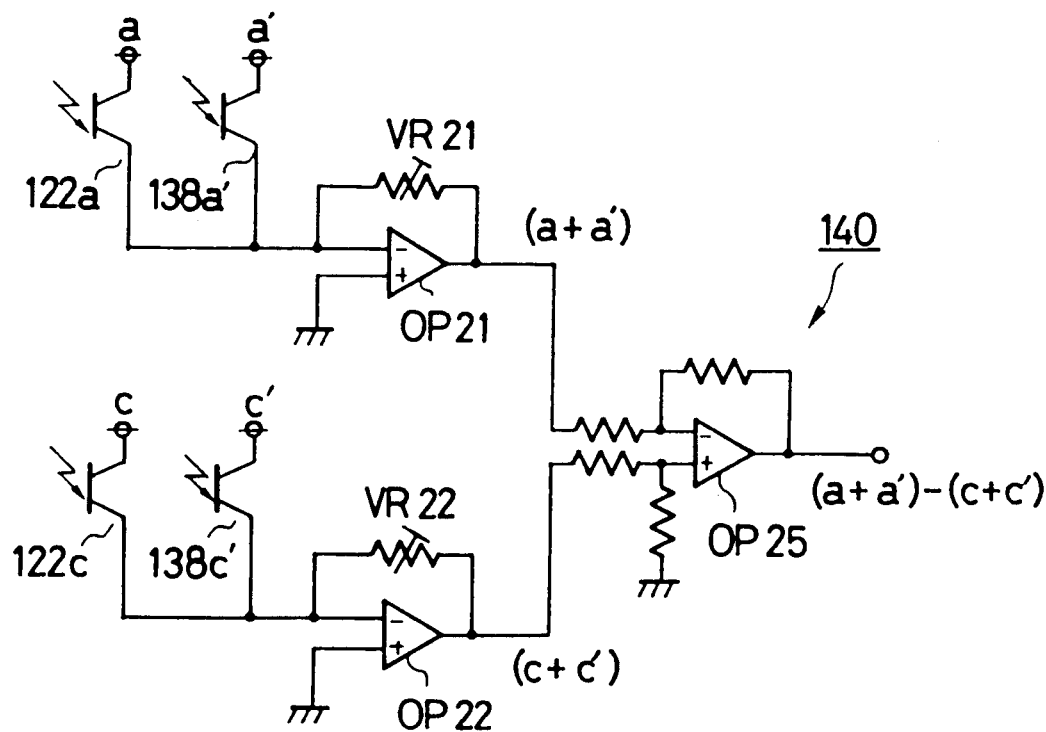
FIGS. 14A and 14B are circuit diagrams illustrating an example of the signal processing circuit for use in the sixth embodiment.
Figure 14B:
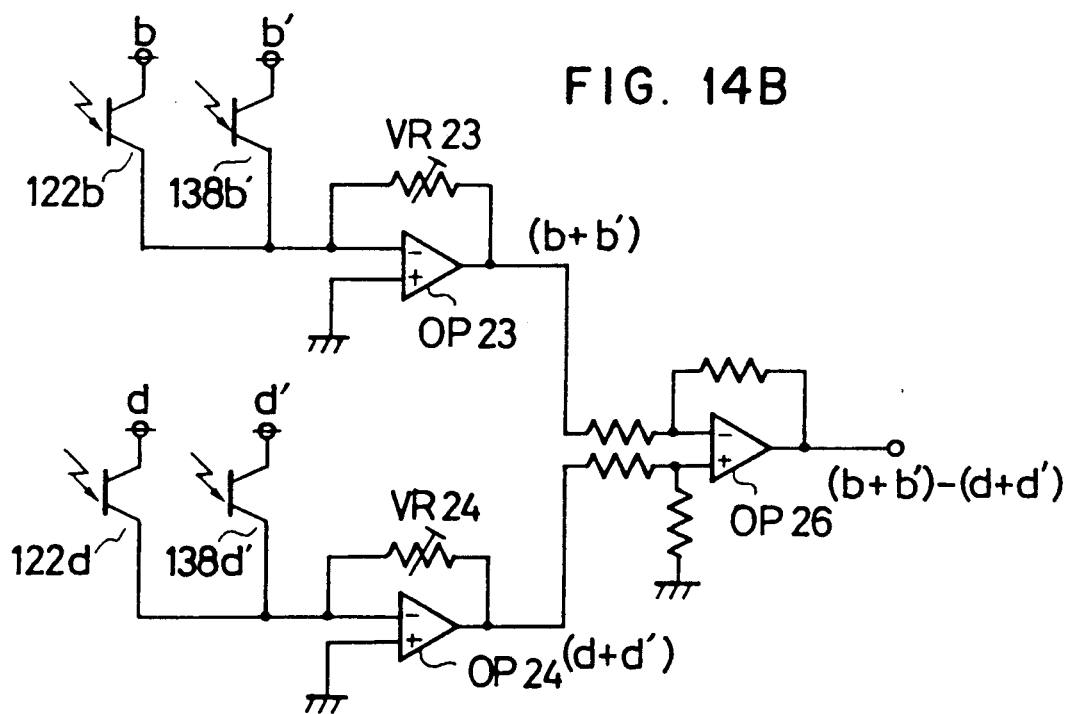

FIG. 14 shows a signal processing circuit 140, which forms two phase detection signals based upon outputs from the displacement detecting optical detector elements 122a to 122d and from the DC level detecting optical detector elements 138a' to 138d'. The signal processing circuit 140 comprises, as illustrated in FIG. 14, an operational amplifier OP21 which is made variable in its amplification factor by a variable resistor VR21 and which is to add and amplify the output signals a, a' from the optical detector elements 122a, 138a', an operational amplifier OP22 which is made variable in its amplification factor by a variable resistor VR22 and which is to add and amplify output signals c, c' from the optical detector elements 122c, 138c', an operational amplifier OP23 which is made variable in its amplification factor by a variable resistor VR23 and which is to add and amplify the output signals b, b' from the optical detector elements 122b, 138b', an operational amplifier OP24 which is made variable in its amplification factor by a variable resistor VR24 and which is to add and amplify the output signals d, d' from the optical detector elements 122d, 138d', an operational amplifier OP25 for delivering a difference signal $(a+a')-(c+c')$ between an output signal $(a+a')$ from the operational amplifier OP21 and an output signal $(c+c')$ from the operational amplifier OP22 as one of the two phase detection signals, and an operational amplifier OP26 for delivering a difference signal $(b+b')-(d+d')$ between an output signal $(b+b')$ from the operational amplifier OP23 and an output signal $(d+d')$ from the operational amplifier OP24 as the other of the two phase detection signals.

Figure 3A:
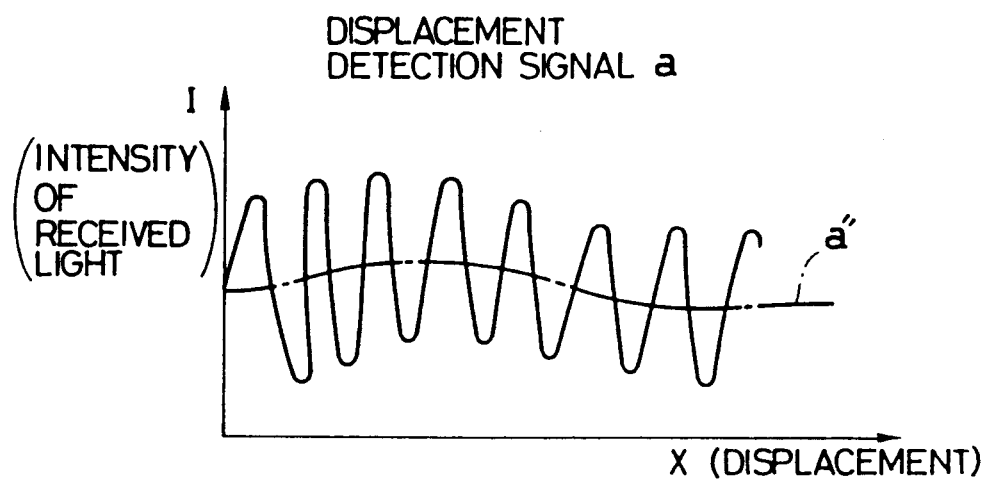
FIGS. 3A-3C depict diagrams of waveforms of a displacement detection signal, a DC level detection signal, and a detection signal after correction illustrating the second principle of the present invention.
Figure 3B:
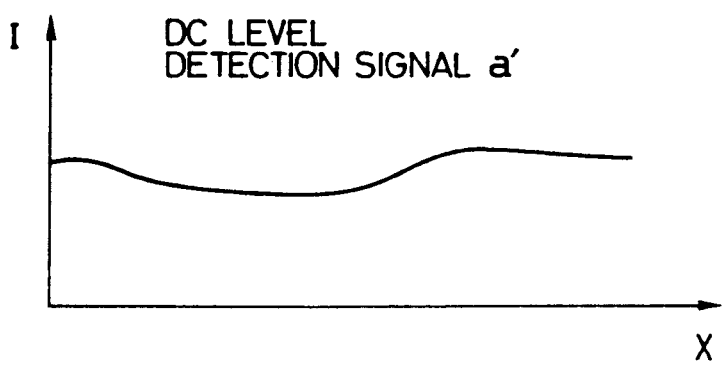
Figure 3C:
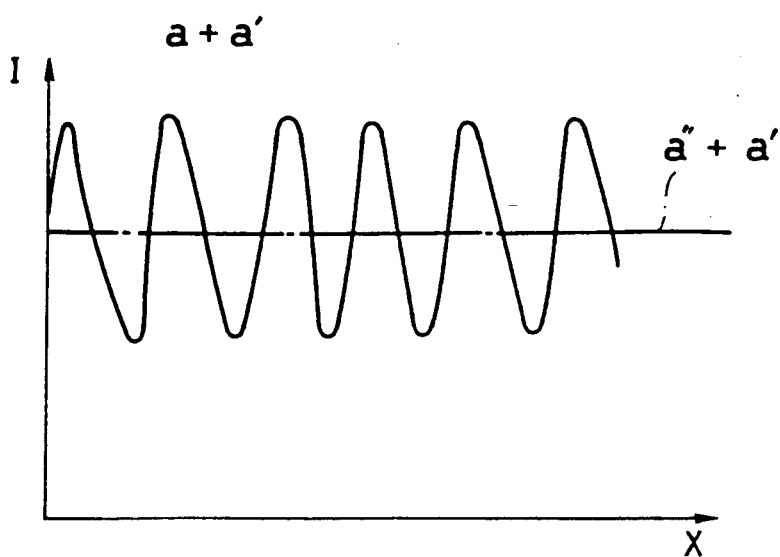

In the present embodiment, the two phase detection signals are similar to $a+a'$ as illustrated in FIG. 3 when the index scale 118 is relatively moved with respect to the main scale 114, showing that its amplitude component is varied but its DC component remains unchanged. This assures a very stable detection signal, resulting in a highly accurate measured signal by highly accurate interpolation.

Since in the present embodiment the displacement detection signals a to d and the DC level detection signals a' to d' are amplified by the operational amplifiers OP21 to OP24 for each of their summations $(a+a')$ to $(d+d')$, the signal processing circuit 140 is simplified in its construction.

Figure 15A:
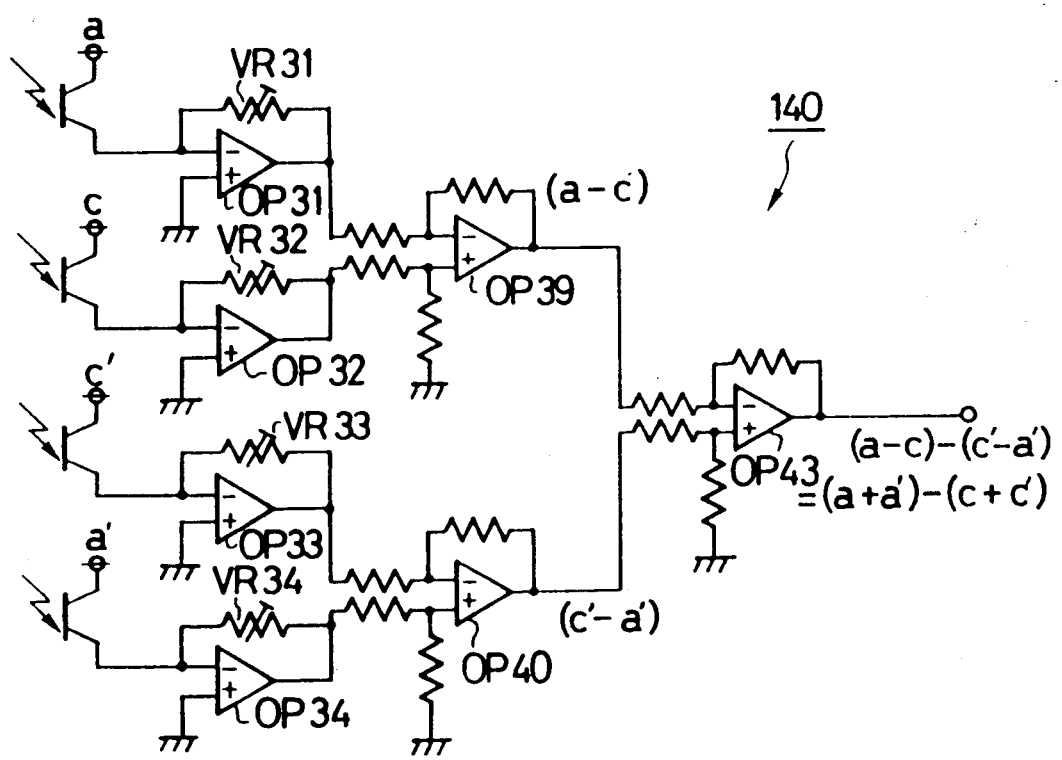
FIGS. 15A and 15B are circuit diagrams illustrating another example of the signal processing circuit for use in the sixth embodiment.
Figure 15B:
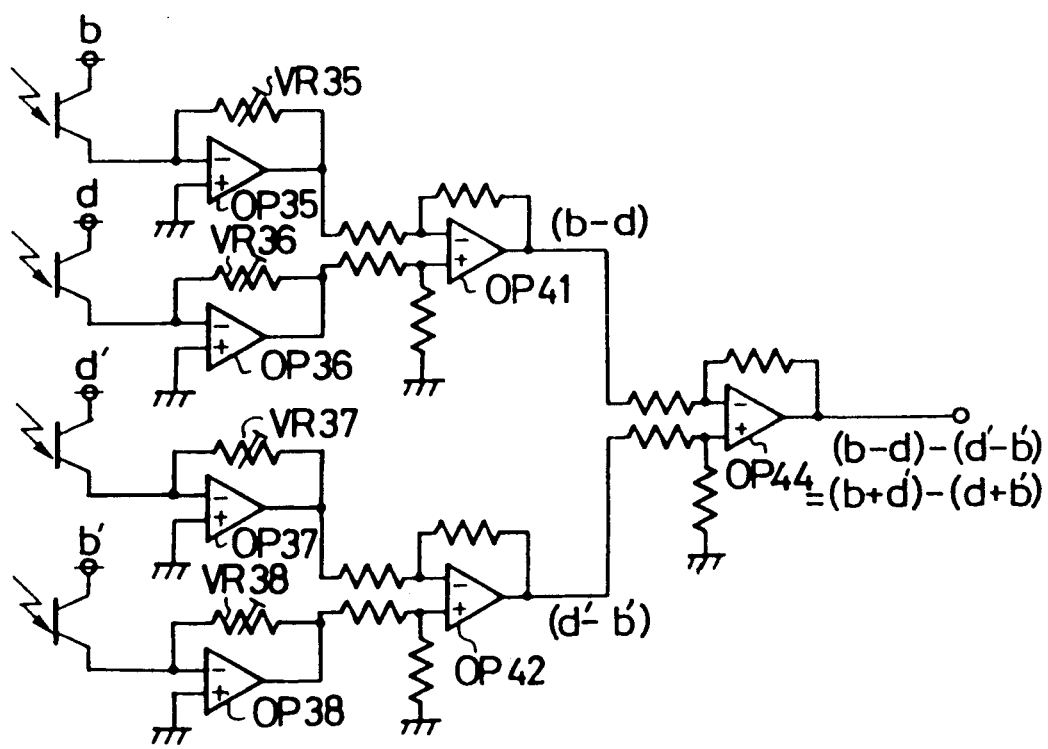

The signal processing circuit 140 is not limited to that shown in FIG. 14. As illustrated in FIG. 15 for example, the displacement detection signals of the two phases may be derived as follows: The detection signals a to d and a' to d' are amplified by operational amplifiers OP31 to OP38, respectively, which have been made variable in their amplification factors by variable resistors VR31 to VR38 for each detection signal, and the difference signals of the respective phases $(a-c)$, $(c'-a')$, $(b-d)$, and $(d'-b')$ are evaluated by operational amplifiers OP39 to OP42 for each of the displacement detection signals a to d and of the DC level detection signals a' to d'. Further, difference signals between the displacement detection signals and the DC level detection signals $(a-c)-(c'-a')=(a+a')-(c+c')$ and $(b-d)-(d'-b')=(b+b')-(d+d')$ are evaluated by operational amplifiers OP43 and OP44. Since in this situation levels of the detection signals a to d and a' to d' are adjustable for each detection signal, graduation lines for light amount adjustment on the sub gratings 136a' to 136d' can be omitted and the transmission windows are made simple.

Figure 16:
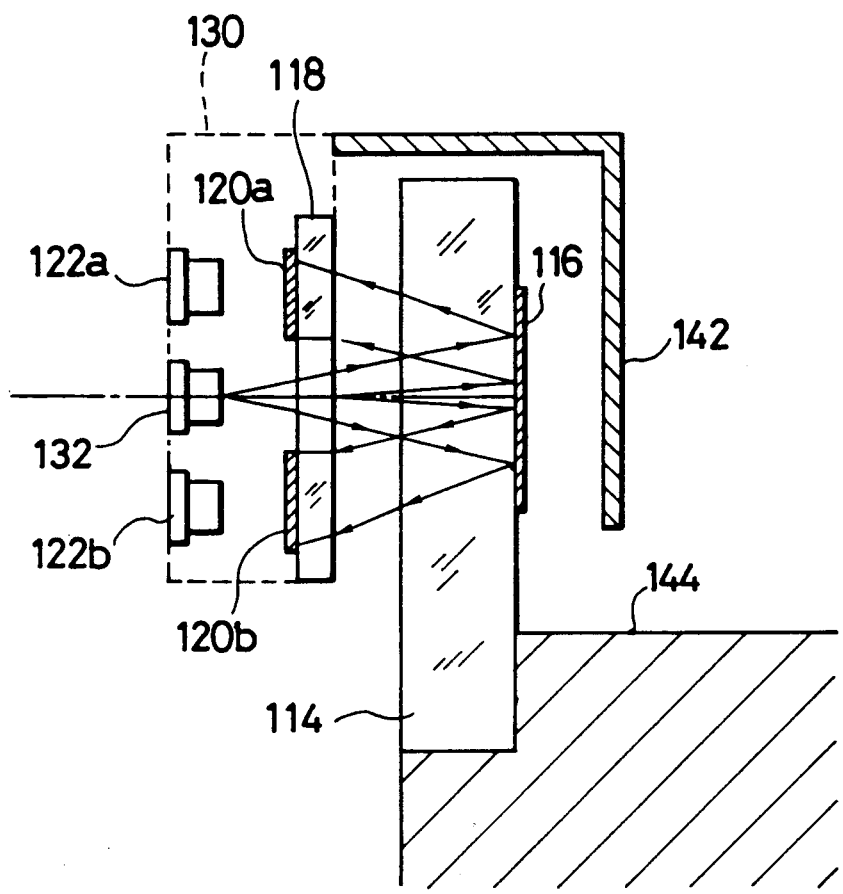
FIG. 16 is a cross sectional view illustrating the construction of a portion of a seventh embodiment of the present invention.

In the present embodiment, a back incident light which illuminates the main grating 116 from the back side (right-hand side in the figure) of the main scale 114, is obstructed by the second index scale 134 and the DC level detecting optical detector elements 138a' to 138d', and hence prevented from influencing the displacement detection signals a to d. Here, instead of the second index scale 134 and others, an obstructing cover 142 may be provided on the detector 130, as disclosed in a seventh embodiment illustrated in FIG. 16. In FIG. 16, designated at 144 is a base (one of the relatively movable members) to which the lower portion of the main scale 114 is fixed.

Although in the just-mentioned embodiment the principle illustrated in FIG. 3 was applied to the reflecting type photoelectric displacement detector, it can be applied to a transmission type one. In the latter case, a pattern of the sub gratings 120a to 120d of the first index scale 118 is replaced with a pattern of the sub gratings 136a' to 136d' of the second index scale 134.

Figure 17:
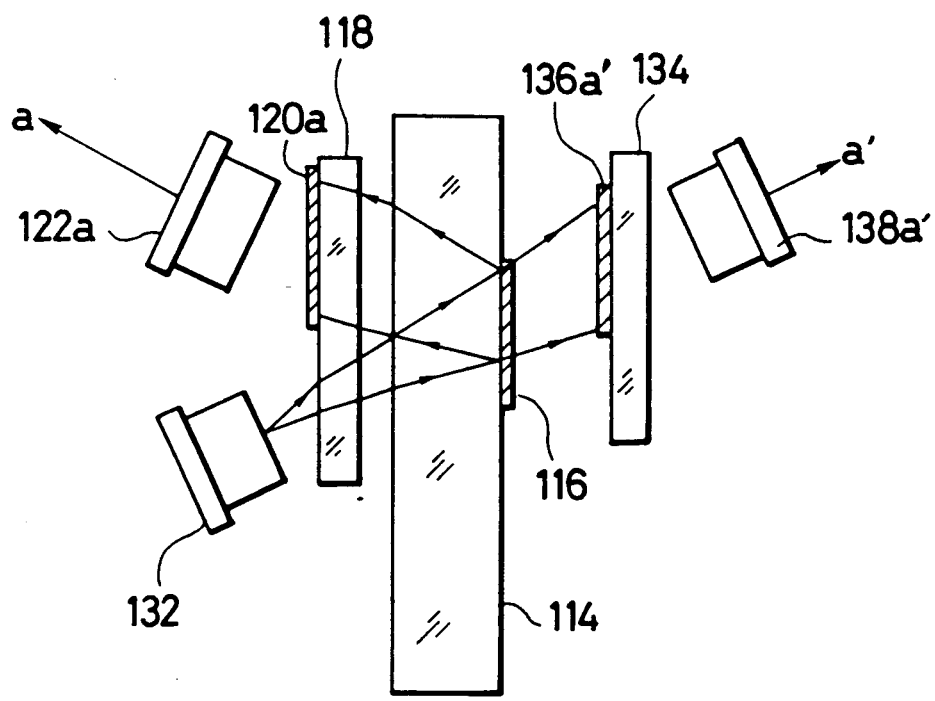
FIG. 17 is a cross sectional view illustrating the construction of an portion of a eighth embodiment of the present invention.
Figure 18:
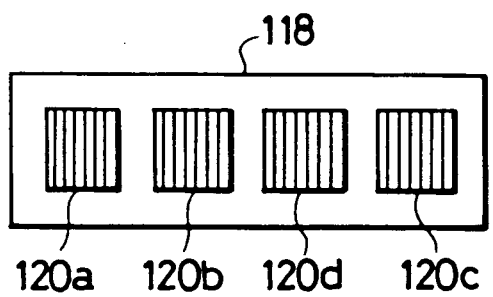
FIG. 18 is a front view illustrating a first index scale for use in the eighth embodiment.
Figure 19:
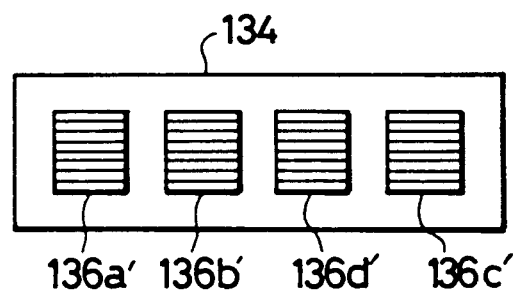
FIG. 19 is a front view illustrating a second index scale for use in the eighth embodiment.

In the following, an eighth embodiment of the present invention will be described with reference to FIGS. 17 to 19.

In the eighth embodiment, the sub gratings 120a to 120d on the first index scale 118 (refer to FIG. 18) and the displacement detecting optical detector elements 122a to 122d are provided on a straight line, and correspondingly the sub gratings 136a' to 136d' on the second index scale 134 (refer to FIG. 19) and the DC level detecting optical detector elements 138a' to 138d' are also provided on a straight line.

Other constructions are the same as those in the sixth embodiment, and hence the description will be omitted.

Although in the above embodiments the sub gratings 136a' to 136d' with graduation lines formed thereon were employed as the reference light transmission windows, if the signal levels are adjustable by other proper methods such as use of the signal processing circuit shown in FIG. 15, for example, a simple transmission windown without graduation lines may be permissible as a reference light transmission window.

Figure 20:
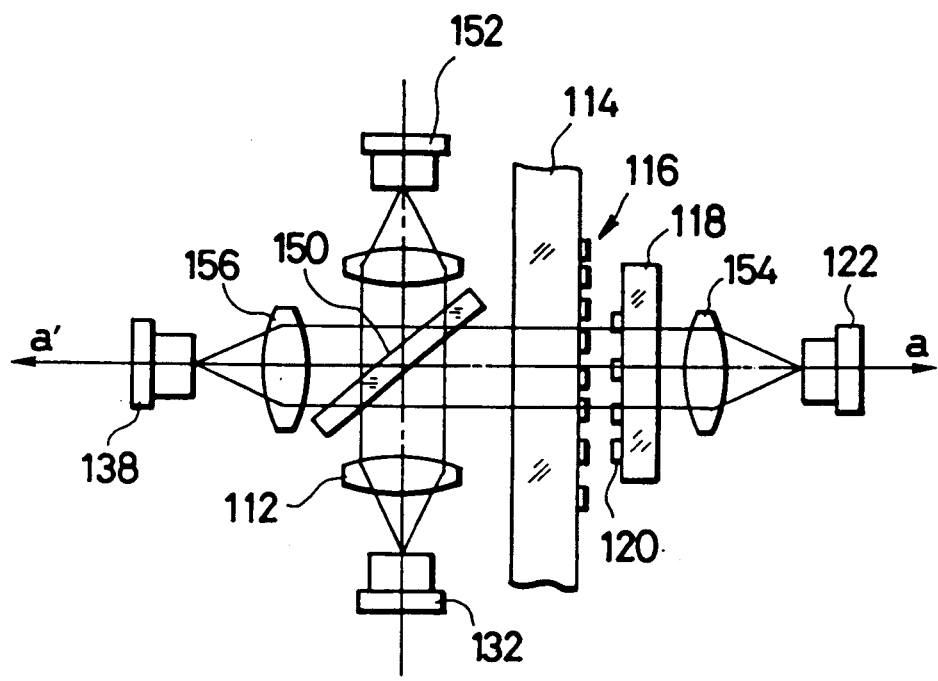
FIG. 20 is a cross sectional view illustrating the construction of a portion of a ninth embodiment of the present invention.
Figure 21:
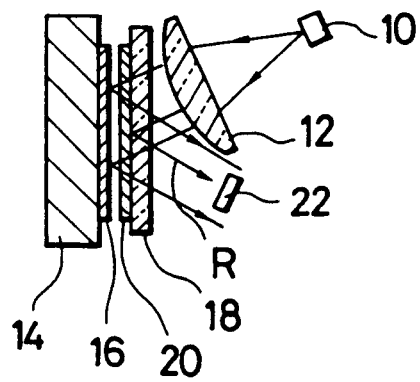
FIG. 21 is a cross sectional view illustrating a conventional reflecting type photoelectric displacement detector.
Figure 22:
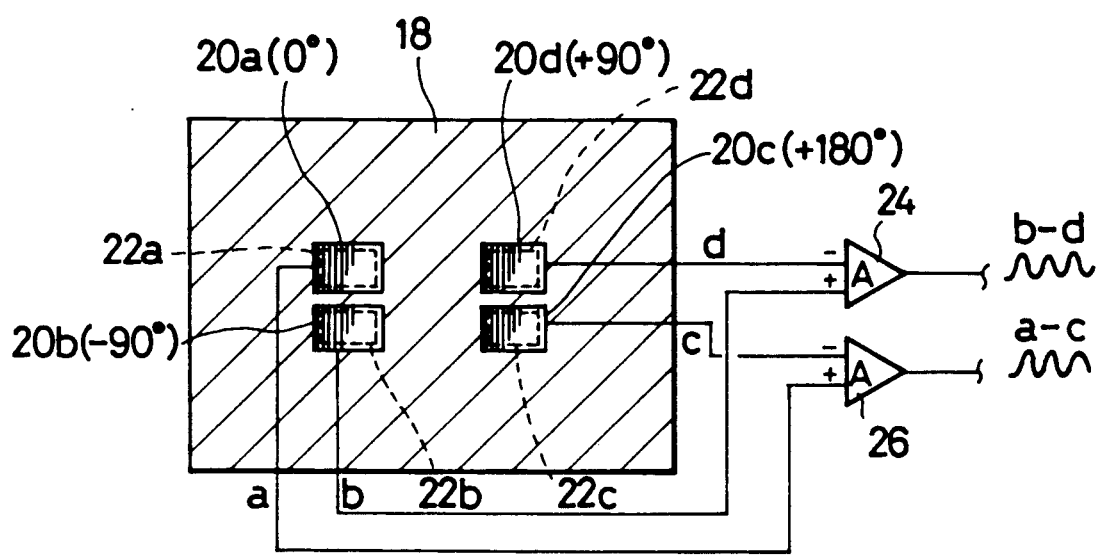
FIG. 22 is a front view illustrating an index scale in the conventional reflecting type photoelectric displacement detector of FIG. 21.
Figure 23A:
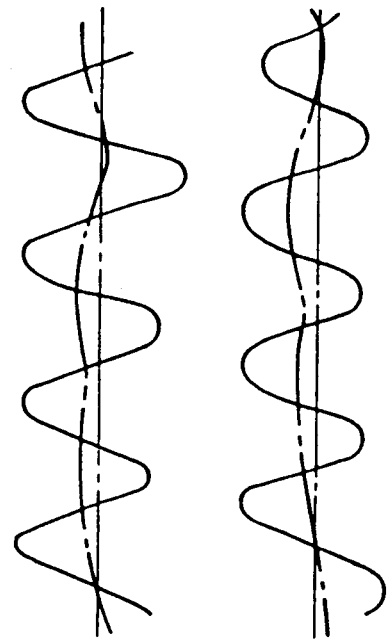
FIGS. 23A and 23B depict diagrams, each illustrating signal waveforms at respective portions in the conventional detector.
Figure 23B:
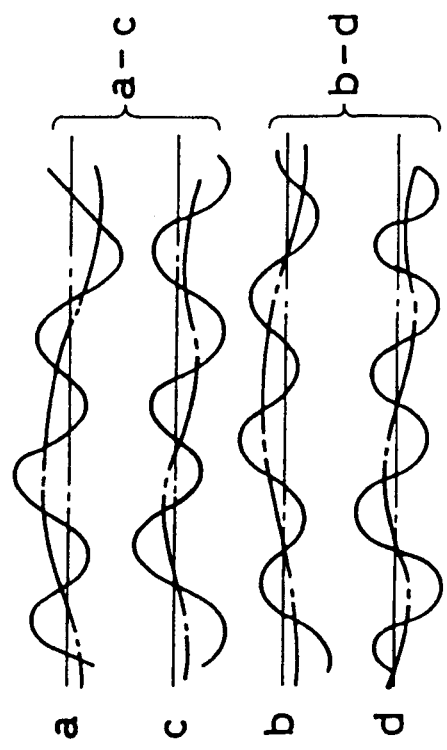

Successively, a ninth embodiment of the present invention will be described with reference to FIG. 20.

In the ninth embodiment, a transmission type photoelectric displacement detector comprises an optically transparent transmission type main scale 114 fixed to one of relatively movable members and including a main grating 116 formed thereon, light source 132, an index scale 118 including a sub grating 120 formed thereon, and a displacement detecting optical detector element 122 for photoelectrically converting transmitted light modulated by the main grating 116 and the sub grating 120, all fixed to the other of the relatively movable members, whereby a periodic detection signal is generated responsively to a relative displacement between both members, the detector further comprising a DC level detecting optical detector 138 for photoelectrically converting the other of the light (reflected light) modulated by the main grating 116 and the sub grating 120, a half mirror or a beam splitter 150 for diverting a light from the light source 132 toward the main scale 114 and directing the reflected light modulated by the main grating 116 and the sub grating 120 to the DC level detecting optical detector element 138, and a light amount monitoring optical detector element 152 for monitoring the amount of the light emanating from the light source 132, whereby DC level variations of a displacement detection signal a yielded by the displacement detecting optical detector element 122 are corrected using a DC level detection signal a' yielded by the DC level detecting optical detector element 138. In the figure, designated at 112 is a collimator lens and 154, 156 are condenser lenses.

An output from the light amount monitoring optical detector element 152 is fed back to a power supply circuit for the light source 132 for example to control the circuit such that the amount of the light from the light source 132 is constant. Here, the light amount monitoring optical detector element 152 may be omitted.

Further, although in the present embodiment the photoelectric displacement detector was of a transmission type, it may be of reflecting type by replacing the function of the displacement detecting optical detector element 122 with that of the DC level detecting optical detector element 138.

Although in the above embodiments the present invention was used for a linear displacement detector, it is obvious that the present invention may also be applied to a rotational displacement detector without limitation to be linear one.

What is claimed is:

1. A photoelectric displacement detector comprised of a main scale fixed to one of relatively movable members and including a main grating formed thereon,
a light source, an index scale including a sub grating formed thereon, and a displacement detecting optical detector element for photoelectrically converting lights modulated by at least said main grating and said sub grating, all fixed to the other of the relatively movable members,
whereby a periodic detection signal is generated responsively to a relative displacement between both said members, the photoelectric displacement detector further comprising:
a reference light transmission window disposed in the vicinity of the sub grating formed on said index scale; and
a reference light optical detector element for photoelectrically converting a light transmitted through said reference light transmission window,
whereby DC level variations of the displacement detection signal yielded by said displacement detecting optical detector element are corrected on the basis of a reference signal yielded by said reference light optical detector element.

2. A photoelectric displacement detector according to claim 1 wherein said reference light transmission window is provided correspondingly to a plurality of the sub gratings, and said reference light optical detector element receives an averaged signal corresponding to the plurality of the sub gratings.

3. A photoelectric displacement detector according to claim 1 wherein the amount of a light transmitted through the reference light transmission window is substantially equal to that transmitted through the sub grating.

4. A photoelectric displacement detector according to claim 1 wherein the the center of gravity of said reference light transmission window is coincident with that of the sub grating.

5. A photoelectric displacement detector comprised of an optically transparent main scale fixed to one of relatively movable members and including a main grating formed thereon,
a light source, a first index scale including a sub grating formed thereon, and a displacement detecting optical detector element for photoelectrically converting lights modulated at least by said main grating and said sub grating, all fixed to the other of the relatively movable members,
whereby a periodic detection signal is generated responsively to a relative displacement between both members, said photoelectric displacement detector further comprising:
a second index scale disposed on the opposite side to said first index scale putting said main scale between it and said first index scale, and including a reference light transmission window formed thereon,
a DC level detecting optical detector element for photoelectrically converting lights transmitted through said main grating and said reference light transmission window,
whereby DC level variations of a displacement detection signal yielded by said displacement detecting optical detector element are corrected with use of a DC level detection signal yielded by said DC level detecting optical detector element.

6. A photoelectric displacement detector according to claim 5 wherein said main scale is of a reflecting type, and said second index scale is disposed on the opposite side to the light source putting the main scale between it and the light source.

7. A photoelectric displacement detector according to claim 5 wherein said main scale is of a transmission type, and said second index scale is disposed on the same side as in the light source with respect to the main scale.

8. A photoelectric displacement detector comprised of an optically transparent main scale fixed to one of relatively movable members and including a main grating formed thereon,
- a light source, an index scale including a sub grating formed thereon, and a displacement detecting optical detector element for photoelectrically converting either a reflected light or a transmitted light modulated at least by said main grating and by said sub grating, all fixed to the other of the relatively movable members,
- whereby a periodic detection signal is generated responsively to a relative displacement between both members, said photoelectric displacement detector further comprising:
- a DC level detecting optical detector element for photoelectrically converting the other of the lights modulated by said main grating and said sub grating,
- whereby DC level variations of the displacement detection signal yielded by said displacement detecting optical detector element are corrected with use of a DC level detection signal yielded by said DC level detecting optical detector element.

9. A reflecting type photoelectric displacement detector comprised of a reflecting optically transparent main scale fixed to one of relating movable members and including a main grating formed thereon,
- a light source, an index scale including a sub grating formed thereon, and a displacement detecting optical detector element for photoelectrically converting lights modulated by at least said main grating and said sub grating, all fixed to the other of the relatively movable memebers,
- whereby a periodic detection signal is generated responsively to a relative displacement between both members, said photoelectric displacement detector further comprising:
- an optical obstructing cover provided on the opposite side to said index scale putting the main scale between it and said index scale for preventing a back incident light, which illuminates the main grating from the back side of the main scale.

* * * * *